June 27, 1933.  W. C. HEDGCOCK ET AL  1,916,139
TRUCK
Filed Aug. 27, 1931   3 Sheets-Sheet 2
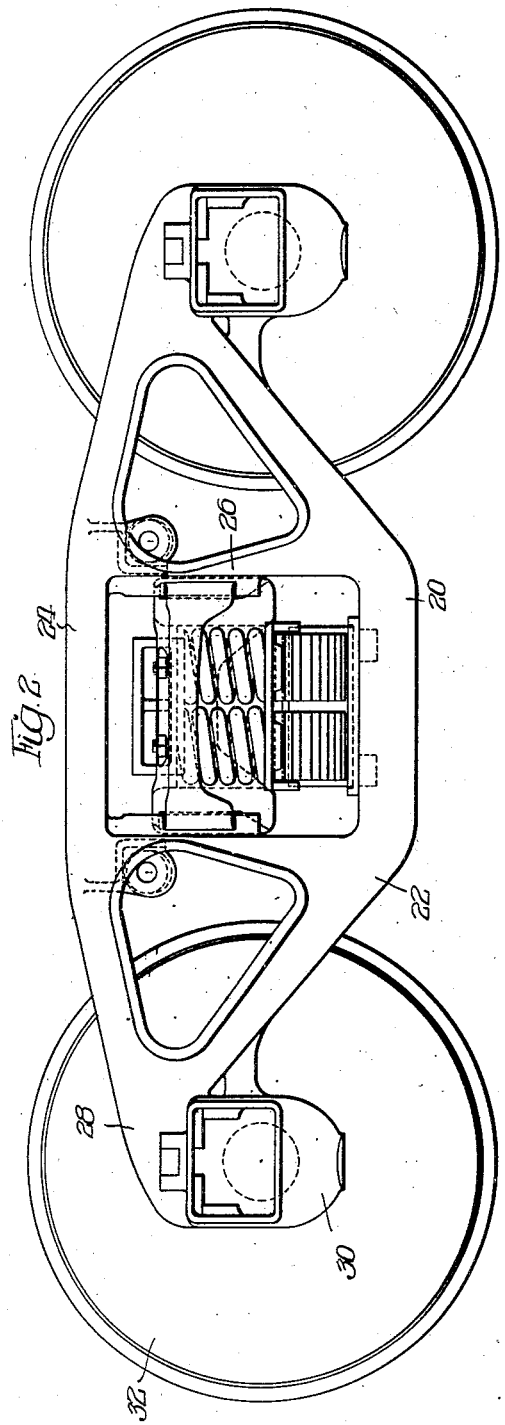
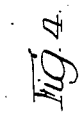
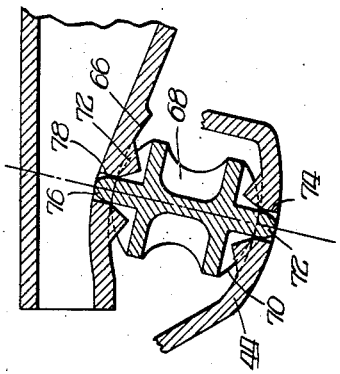
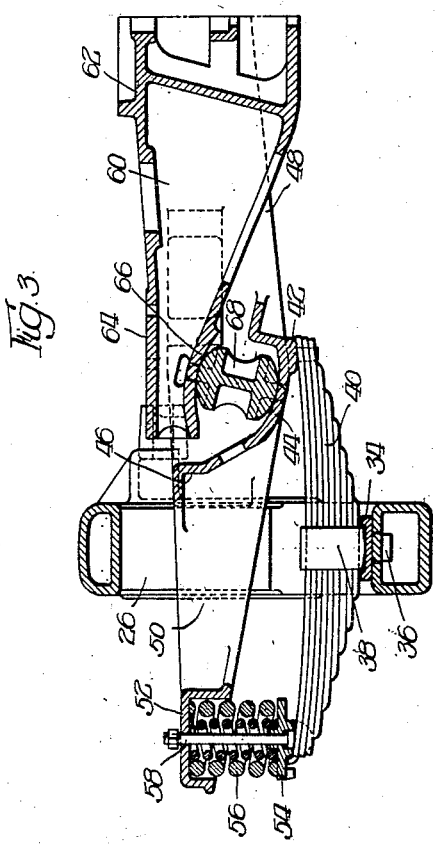
Inventor:
William C. Hedgcock,
Robert E. Darby,

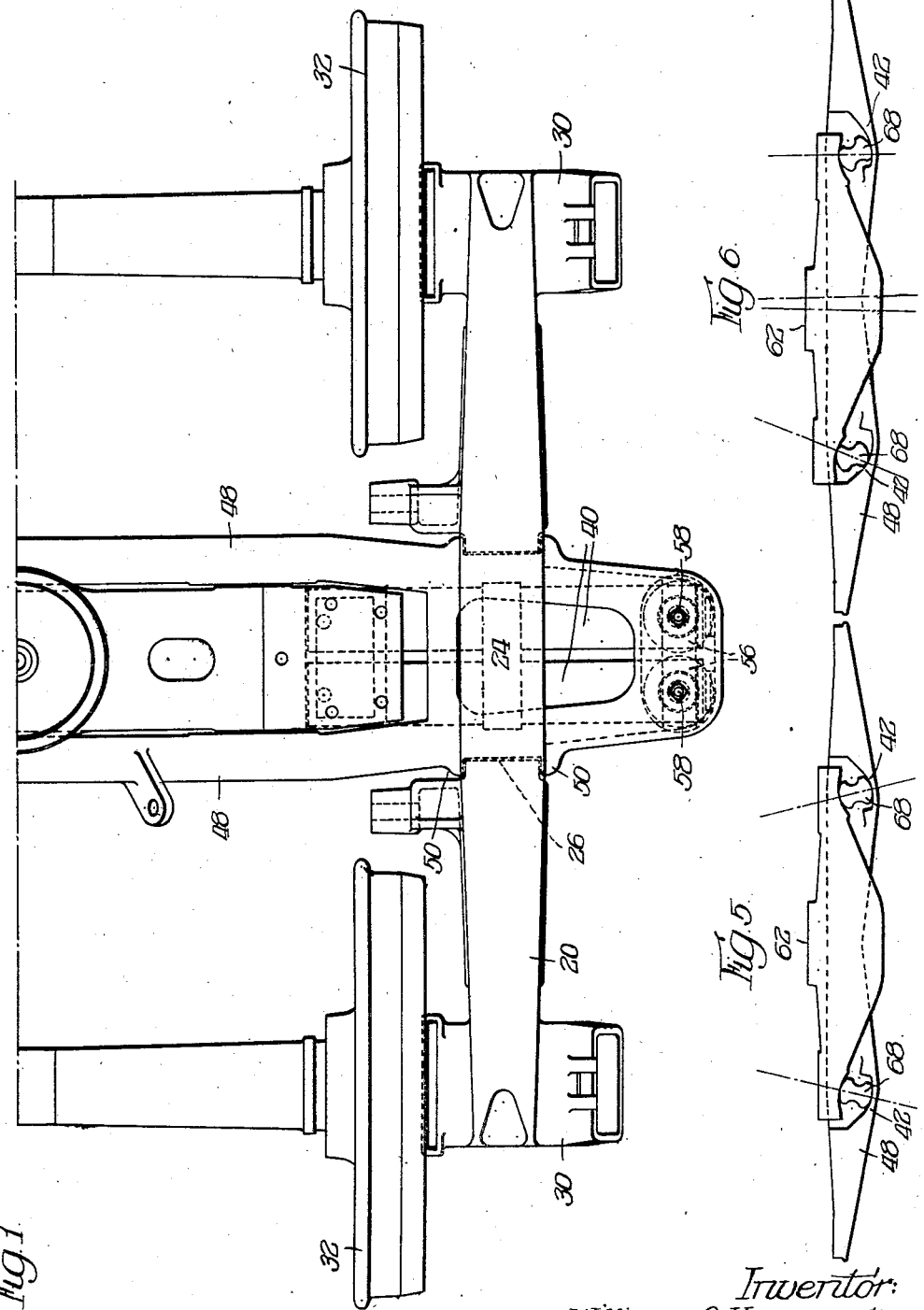

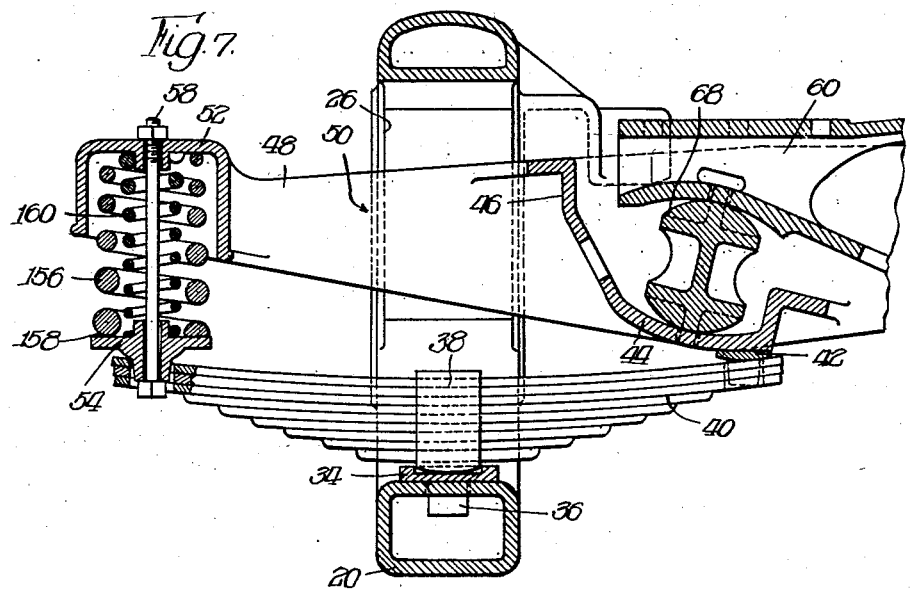
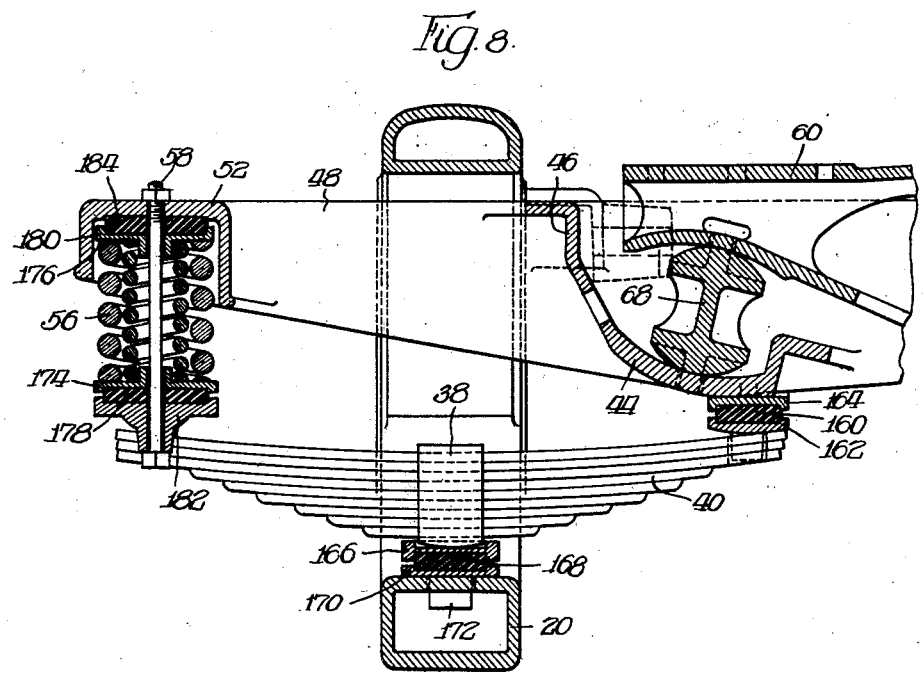

Patented June 27, 1933

1,916,139

UNITED STATES PATENT OFFICE

WILLIAM C. HEDGCOCK, OF WILMETTE, AND ROBERT F. DARBY, OF OAK PARK, ILLINOIS, ASSIGNORS TO AMERICAN STEEL FOUNDRIES, OF CHICAGO, ILLINOIS, A CORPORATION OF NEW JERSEY

TRUCK

Application filed August 27, 1931. Serial No. 559,618.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light quick shocks, the leaf springs to the slow, heavy impulses. Coil springs are quick and sensitive, leaf springs relatively less so, in response. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

A passenger car truck also contributes to easy riding by having the bolster suspended on inclined swing hangers for lateral motion to soften lateral shocks, but this construction is commonly considered too complicated and costly for freight car trucks.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series without complete duplication of carrying capacity in each kind.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

Yet another object is to provide a car truck having a simple and economical lateral motion bolster construction having an action similar to that with inclined swing hangers.

A yet further object is to provide a truck construction wherein resilient pads are provided for dampening out metallic vibrations transmitted through the metallic truck parts, and also for the purpose of deadening noise.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of the truck construction embodying the invention;

Figure 2 is a side elevation of the truck construction shown in Figure 1;

Figure 3 is a transverse fragmentary sectional elevation taken substantially on the transverse center line of the truck construction shown in Figures 1 and 2;

Figure 4 is an enlarged fragmentary sectional elevation through the rocker construction;

Figure 5 is a transverse diagrammatic elevation showing the relative positions between the transom and bolster in normal position;

Figure 6 is a transverse diagrammatic elevation showing the relative positions between the transom and bolster after lateral movement of the bolster;

Figures 7 and 8 are transverse fragmentary sectional elevations showing modified forms of the truck construction.

Referring first of all more particularly to the truck constructions illustrated in Figures 1 to 6 inclusive, the side frame 20 is preferably of truss construction including the tension member 22, the compression member 24 integrally connected by spaced column guides 26 forming an opening or window in said frame. The tension and compression members converge adjacent their ends as at 28 and are provided with the journal boxes 30, shown as of the standard A. R. A. construction, though they may be of any preferable construction. The journal boxes have cooperative relation with the wheel and axle assemblies 32, which also may be of any preferable construction. Although no spring plank is shown connecting the side frames, it is of course to be understood that one may be used.

The side frames between the column guides are provided with the spring seats 34 preferably disposed on the center line of the side frames and positioned by means of the depending dowels 36. The spring bands 38 of the semi-elliptic springs 40 are rockably mounted on the spring seats 34. The inner ends of the semi-elliptic springs are positioned on the transverse connecting member 42 of the transom, said member including a rocker seat 44 and the bolster stop 46. The member 42 serves to connect the spaced members 48 forming the transom. The transom is provided with column guide embracing members 50 having guiding cooperation with said column guides, and the transom is extended outwardly and provided with the spring seat 52 shown in a recess or hood, between which seat and the seat 54 the coil spring assemblies 56 are provided. The spring seat 54 is positioned by means of the guiding bolt assembly 58 extending through the spring seats 52 and 54, and the spring seat 54 is supported on the outer end of the semi-elliptic springs 40.

Between the spaced members 48 the bolster 60 is disposed, the bolster having the center bearing 62 and the side bearings 64, and is provided with the rocker seats 66 between which seats and the seats 44 rockers 68 are provided for supporting the bolster on the transom. The rockers 68 consist essentially of the arcuate portions 70 and 72 engaging the rocker seats 44 and 66, and are positioned by means of the depending members or tongues 73 received in the slots 74, similar upstanding members 76 being provided and received in the slots 78 in the bolster.

It will be seen that the axes of the rockers converge upwardly, and in the preferred construction the arcuate surfaces of the rocker members 68 are portions of a cylinder having a common center for the radii. The arcuate surfaces on the seats 44 and 66 are formed with a larger radius than the radius of the faces of the rockers. This arrangement of the elements of the rocker system permits a restricted transverse motion practically the same as obtained with the familiar inclined swing hanger arrangement now in use particularly on passenger car trucks. The inclination of the rocking surface axes provides the desired resistance to too free lateral motion, but when considerable lateral forces are encountered this resistance is overcome, permitting lateral motion of the bolster with the transmission of forces to other parts of the truck within the limits of the stops 46.

When lateral motion takes place the end of the bolster toward the direction of motion rises, while the opposite end becomes lower, which has the effect of causing the lateral motion to follow a curved path, and to tilt the car body. The upward converging inclination of the axes of the rocking surfaces causes an end thrust on each rocker against the bolster, which thrusts balance each other in normal position, but give some resistance to lateral motion. When lateral forces exceed the lateral resistance of the rockers lateral motion takes place, and the position of parts shown in Figure 6 is obtained. The resistance increases as the motion increases. In any position there is a force tending to spread the lower rocker seats due to the downward divergence of the axes of contact of the rocking surfaces. This spreading force is resisted and the rocker seats maintained in proper relation to each other by their being tied together in the transom construction.

The parts of the truck constructions shown in Figures 7 and 8 correspond substantially to that shown in Figure 3, so therefore like reference characters are used to designate like parts.

In Figure 7, however, the coil spring assembly 156 is similar to that illustrated in Figure 17 in application Serial No. 559,617, filed August 27, 1931, wherein the tapering coil spring is formed from a bar of tapering diameter. That is, the bar before coiling has a gradually increasing diameter from one end to the other. When wound into a spring having substantially uniform spacing between the coils such a tapered bar spring has the coils close successively under load. That is, the coils close progressively from the small diameter of the bar to the large diameter of the bar. This provides a coil spring of variable stiffness having considerable softness under light loads, and considerable stiffness and high capacity under heavy loads. On account of its varying stiffness such a spring does not build up synchronous vibration to the extent of the ordinary coil spring.

It will be noted that the coil spring assembly 156 consists, in the modification shown, of the outer tapering coil spring 158 and the inner tapering coil spring 160 facing in the opposite direction. That is, the large coils of the coil spring 158 are disposed downwardly, while the large coils of the assembly 160 are disposed upwardly. It will be appreciated, however, that any combination of these springs may be used.

In the construction shown in Figure 8 the rubber pads are used substantially as indicated in application Serial No. 559,617, filed August 27, 1931. More specifically, a rubber pad 160 is mounted between the members 162 and 164 engaging the inner end of the leaf spring 40 and being secured to the transverse rocker supporting member 44. The spring band 38 is seated upon the member 166, the rubber pad 168 being disposed between the member 166 and the member 170 secured to the side frame as by means of the dowel 172. The coil spring assembly 56 is mounted between the caps 174 and 176, said caps being provided with the rubber pads 178 and 180 mounted between the spring engaging member 182 and the transom pad seat 184, the bolt 58 being provided for securing the spring assembly together. Although a constant diameter and constant pitch spring is shown, it is understood that with a variable pitch spring or a spring of variable diameter such as shown in Figure 7 may be used. It is also to be understood that the rubber pads may be used in any combination. That is, the pad 160 may be used alone or in combination with any other pads or their combinations.

Another modification may be had by using a variable stiffness coil spring, the coil spring being formed from a bar of uniform diameter but wound in a variable pitch so that the coils close progressively from the smallest pitch to the greatest pitch. This also provides a coil spring of variable stiffness having considerable softness under light loads and considerable stiffness and high capacity under heavy loads. This also tends to avoid synchronous vibration.

Of course it is to be understood that the rubber pads may be used in any combination in any of the constructions shown, and that the term "rubber" is used to cover any substance having cushioning qualities such as rubber has. By the use of rubber or resilient pads the metallic vibrations coming through the truck structure are dampened out, thereby promoting easy riding as well as relieving the truck parts, car body and lading of the destructive action which might be caused by minute vibrations. The rubber pads also serve to deaden the noise which would otherwise be transmitted through the metallic parts.

It is also to be understood that any spring arrangement such as shown in application Serial No. 552,153, filed July 21, 1931, may be used, and that we do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In a car truck, the combination of a side frame, a transom, a bolster having center and side bearings supported on said transom, a leaf spring interposed between said side frame and transom and supported on said side frame at a point intermediate the ends of said spring, and resilient means interposed between a portion of said transom and leaf spring.

2. In a car truck, the combination of a side frame, a transom, a bolster having center and side bearings supported on said transom, a leaf spring interposed between said side frame and transom and supported on said side frame at a point intermediate the ends of said spring, and a coil spring partially supporting said transom on said leaf spring.

3. In a car truck, the combination of a side frame, a transom, a leaf spring interposed between said side frame and transom and supported on said side frame at a point intermediate the ends of said spring, resilient means interposed between a portion of said transom and leaf spring, and a bolster having center and side bearings and mounted for lateral motion on said transom.

4. In a car truck, the combination of a side frame, a transom, a leaf spring interposed between said side frame and transom and supported on said side frame at a point intermediate the ends of said spring, a coil spring partially supporting said transom on said leaf spring, and a bolster mounted for lateral motion on said transom.

5. In a car truck, the combination of a side frame, a transom, a leaf spring interposed between said side frame and transom, and a coil spring operatively connected to said transom and leaf spring outwardly of said side frame.

6. In a car truck, the combination of a side frame, a transom, a leaf spring interposed between said side frame and transom, a coil spring operatively connected to said transom and leaf spring outwardly of said side frame, and a bolster mounted for lateral movement adjacent said transom.

7. In a car truck, the combination of a side frame, a transom, a bolster having center and side bearings supported on said transom, a leaf spring interposed between said side frame and transom and in supporting relation to said transom at a plurality of points, and resilient means interposed between a portion of said transom and leaf spring.

8. In a car truck, the combination of a side frame, a transom, a bolster having center and side bearings supported on said transom, a leaf spring interposed between said side frame and transom and supporting said transom at a plurality of points, and resilient means interposed between one of said points of support of the leaf spring and said transom.

9. In a car truck, the combination of a side frame, a transom, a bolster having center and side bearings supported on said transom, a leaf spring interposed between said side frame and transom and in supporting relation to said transom at a plurality of points, and a coil spring operatively connected to said transom and leaf spring.

10. In a car truck, the combination of a side frame, a transom, a leaf spring interposed between said side frame and transom and in supporting relation to said transom at a plurality of points, resilient means interposed between a portion of said transom and leaf spring, and a bolster having center and side bearings and mounted for lateral movement adjacent said transom.

11. In a car truck, the combination of a side frame, a transom, a leaf spring interposed between said side frame and transom and supporting said transom at a plurality of points, resilient means interposed between one of said points of support of the leaf spring and said transom, and a bolster mounted for lateral movement adjacent said transom.

12. In a car truck, the combination of a side frame, a transom, a leaf spring interposed between said side frame and transom and in supporting relation to said transom at a plurality of points, a coil spring operatively connected to said transom and leaf spring, and a bolster having center and side bearings and mounted for lateral movement adjacent said transom.

13. In a car truck, the combination of a side frame, a transom, a leaf spring interposed between said side frame and transom and supporting said transom at a plurality of points, one of said points being outwardly of the side frame, and resilient means interposed between one of said points of support of the leaf spring and said transom.

14. In a car truck, the combination of a side frame, a transom, a leaf spring interposed between said side frame and transom and supporting said transom at a plurality of points, one of said points being outwardly of the side frame, and resilient means interposed between said last named point of support between said leaf spring and transom.

15. In a car truck, the combination of a side frame, a transom, a leaf spring interposed between said side frame and transom and supporting said transom at a plurality of points, one of said points being outwardly of the side frame, resilient means interposed between one of said points of support of the leaf spring and said transom, and a bolster mounted for lateral movement adjacent said transom.

16. In a car truck, the combination of a side frame, a transom, a leaf spring interposed between said side frame and transom and supporting said transom at a plurality of points, one of said points being outwardly of the side frame, resilient means interposed between said last named point of support between said leaf spring and transom, and a bolster mounted for lateral movement adjacent said transom.

17. In a car truck, the combination of a side frame, a transom, said transom including spaced members and an integral connecting member disposed outwardly of said side frame, a seat member integrally connecting said spaced members inwardly of said side frame, a leaf spring supported on said side frame and having portions supportingly cooperating with said connecting member and said seat member, resilient means interposed between said leaf spring and one of said last named members, and a bolster disposed between said spaced members and supported by said seat member.

18. In a car truck, the combination of a side frame, a transom, said transom including spaced members and an integral connecting member disposed outwardly of said side frame, a seat member integrally connecting said spaced members inwardly of said side frame, a leaf spring supported on said side frame and having portions supportingly cooperating with said connecting member and said seat member, resilient means interposed between said leaf spring and one of said last named members, a bolster disposed between said spaced members, and a rocker interposed between said bolster and seat member for movably supporting said bolster on said transom.

19. In a car truck, the combination of a side frame, a transom, said transom including spaced members and an integral connecting member disposed outwardly of said side frame, a seat member integrally connecting said spaced members inwardly of said side frame, a leaf spring supported on said side frame and having portions supportingly cooperating with said connecting member and said seat member, resilient means interposed between said leaf spring and one of said last named members, a bolster disposed between said spaced members, and a rocker interposed between said bolster and seat member for movably supporting said bolster on said transom, said seat member being provided with means for limiting movement of said bolster.

20. In a car truck, the combination of a side frame, a transom, said transom including spaced members and an integral connecting member disposed outwardly of said side frame, a seat member integrally connecting said spaced members inwardly of said side frame, a leaf spring supported on said side frame and having portions supportingly cooperating with said connecting member and said seat member, a coil spring of variable pitch interposed between said leaf spring and one of said last named members, and a bolster disposed between said spaced members and supported by said seat member.

21. In a car truck, the combination of a side frame, a transom, said transom including spaced members and an integral connecting member disposed outwardly of said side frame, a seat member integrally connecting said spaced members inwardly of said side frame, a leaf spring supported on said side frame and having portions supportingly cooperating with said connecting member and said seat member, a coil spring of variable stiffness interposed between said leaf spring and one of said last named members, and a bolster disposed between said spaced members and supported by said seat member.

22. In a car truck, the combination of a side frame, a transom, said transom including spaced members and an integral connecting member disposed outwardly of said side frame, a seat member integrally connecting said spaced members inwardly of said side frame, a leaf spring supported on said side frame and having portions supportingly cooperating with said connecting member and said seat member, a spring of different characteristics from said leaf spring interposed between said leaf spring and one of said last named members, and a bolster disposed between said spaced members and supported by said seat member.

23. In a car truck, the combination of a side frame, a transom, said transom including spaced members and an integral connecting member disposed outwardly of said side frame, a seat member integrally connecting said spaced members inwardly of said side frame, a leaf spring supported on said side frame and having portions supportingly cooperating with said connecting member and said seat member, a tapering coil spring interposed between said leaf spring and one of said last named members, and a bolster disposed between said spaced members and supported by said seat member.

24. In a car truck, the combination of a side frame, a transom, said transom including spaced members and an integral connecting member disposed outwardly of said side frame, a seat member integrally connecting said spaced members inwardly of said side frame, a leaf spring supported on said side frame and having portions supportingly cooperating with said connecting member and said seat member, resilient means interposed between said leaf spring and one of said last named members, a resilient member mounted between said leaf spring and an associated member, and a bolster disposed between said spaced members and supported by said seat member.

25. In a car truck, the combination of a side frame, a transom, a bolster having center and side bearings supported on said transom, a friction assembly including a semi-elliptic leaf spring interposed between said side frame and transom, and supported on said side frame at a point intermediate the ends of said spring and resilient means interposed between a portion of the transom and friction assembly.

26. In a car truck, the combination of a side frame, a transom, a bolster having center and side bearings supported on said transom, a friction assembly including a semi-elliptic leaf spring interposed between said side frame and transom and supported on said side frame at a point intermediate the ends of said spring, and a coil spring operatively connected to said transom and friction assembly.

27. In a car truck, the combination of a side frame, a transom, a bolster having center and side bearings supported on said transom, a friction assembly including a semi-elliptic leaf spring interposed between said side frame and transom and supported on said side frame at a point intermediate the ends of said spring, and a coil spring operatively connected in series to said transom and friction assembly.

28. In a car truck, the combination of a side frame, a transom, a friction assembly including a semi-elliptic leaf spring interposed between said side frame and transom and supported on said side frame at a point intermediate the ends of said spring, a coil spring partially supporting said transom on said friction assembly, and a bolster movably mounted on said transom.

29. In a car truck, the combination of a side frame, a transom, said transom including spaced members and an integral connecting member disposed outwardly of said side frame, a seat member integrally connecting said spaced members inwardly of the side frame, a friction assembly supported on said side frame and supportingly cooperating with said connecting member and said seat member, resilient means interposed between said friction assembly and one of said last named members, and a bolster supported on said seat member.

30. In a car truck, the combination of a side frame, a transom, said transom including spaced members and integral connecting members disposed outwardly and inwardly of said side frame, a friction assembly supported on said side frame and supportingly cooperating with said connecting members, resilient means interposed between said friction assembly and one of said last named members, and a bolster having center and side bearings and supported by said transom.

31. In a car truck, the combination of a side frame, a transom, said transom including spaced members and integral connecting members disposed outwardly and inwardly of said side frame, a friction assembly supported on said side frame and supportingly cooperating with said connecting members, a coil spring interposed between said friction assembly and one of said last named members, and a bolster having center and side bearings and supported by said transom.

32. In a car truck, the combination of a side frame and a transom, a spring supported at a single point by said side frame and providing spaced points of support for said transom, and a truck bolster having center and side bearings and supported by said transom.

33. In a car truck, the combination of a side frame, a transom, a bolster having center and side bearings supported on said transom, a leaf spring supporting said transom at a plurality of points, and a coil spring interposed between said transom and leaf spring, said leaf spring being supported on said side frame at a single point.

34. In a car truck, the combination of a side frame, a transom, a bolster having center and side bearings supported on said transom, a leaf spring supporting said transom at a plurality of points, and a coil spring interposed between said transom and leaf spring at one of the points of support, said leaf spring being supported on said side frame at a single point.

35. In a truck, the combination of a side frame having spaced tension and compression members and connecting spaced column guides forming a transom opening, a transom extending through said opening and slidably cooperating with said guides, a leaf spring supporting said transom at a plurality of points and carried by said tension member between said guides, and a coil spring disposed between said first named spring and transom.

36. In a transom, the combination of a body portion having means for supporting a bolster, said body portion and said means being provided with spring seats.

37. In a transom, the combination of a body portion having means adjacent the ends thereof for cooperative engagement with an associated side frame, means on said body portion for supporting an associated bolster, and pairs of spring seats spaced longitudinally of said transom, the seats of each pair being disposed on opposite sides of said first named means and spaced therefrom in a direction longitudinally of the transom.

38. In a truck, the combination of spaced side frames, a transom disposed between said side frames and having cooperative engagement therewith for tying said side frames together, said transom including spaced members extending outwardly of said side frames, rocker seats connecting said spaced members inwardly of said side frames, a bolster disposed between said spaced members, rockers interposed between said rocker seats and said bolster for supporting said bolster for movement transversely of the truck, a spring seat associated with each of said rocker seats, a spring seat disposed on said transom outwardly of each of said side frames, and a leaf spring supported on each of said side frames and supporting said transom at the seats provided thereon.

39. In a truck, the combination of spaced side frames, a transom disposed between said side frames and having cooperative engagement therewith for tying said side frames together, said transom including spaced members extending outwardly of said side frames, rocker seats connecting said spaced members inwardly of said side frames, a bolster disposed between said spaced members, rockers interposed between said rocker seats and said bolster for supporting said bolster for movement transversely of the truck, a spring seat associated with each of said rocker seats, a spring seat disposed on said transom outwardly of each of said side frames, and a leaf spring supported on each of said side frames and supporting said transom at the seats provided thereon and a coil spring interposed between one of said seats and each of said leaf springs.

40. In a truck, the combination of spaced side frames, a transom disposed between said side frames, said transom including spaced members extending outwardly of said side frames, rocker seats connecting said spaced members inwardly of said side frames, a bolster disposed between said spaced members, rockers interposed between said rocker seats and said bolster for supporting said bolster for movement transversely of the truck, a spring seat associated with each of said rocker seats, a spring seat disposed on said transom outwardly of each of said side frames, and a leaf spring supported on each of said side frames and supporting said transom at the seats provided thereon.

41. In a truck, the combination of spaced side frames, a transom disposed between said side frames, said transom including spaced members extending outwardly of said side frames, rocker seats connecting said spaced members inwardly of said side frames, a bolster disposed between said spaced members, rockers interposed between said rocker seats and said bolster for supporting said bolster for movement transversely of the truck, a spring seat associated with each of said rocker seats, a spring seat disposed on said transom outwardly of each of said side frames, and a leaf spring supported on each of said side frames and supporting said transom at the seats provided thereon and a coil spring interposed between one of said seats and each of said leaf springs.

42. In a truck, the combination of spaced side frames including tension and compression members and spaced columns integrally connecting said tension and compression members and forming a window therewith, a transom disposed between said side frames and having means slidably cooperating with said columns for tying said side frames together, said transom including spaced members extending through said window outwardly of said side frames, rocker seats connecting said spaced members inwardly of said side frames, a bolster disposed between said spaced members, rockers interposed between said rocker seats and said bolster for supporting said bolster for movement transversely of the truck, a spring seat associated with each of said rocker seats, a spring seat disposed on said transom outwardly of each of said side frames, and a leaf spring supported on each of said side frames in the windows thereof and supporting said transom at the seats provided thereon.

43. In a truck, the combination of spaced side frames including tension and compression members and spaced columns integrally connecting said tension and compression members and forming a window therewith, a transom disposed between said side frames and having means slidably cooperating with said columns for tying said side frames together, said transom including spaced members extending through said window outwardly of said side frames, rocker seats connecting said spaced members inwardly of said side frames, a bolster disposed between said spaced members, rockers interposed between said rocker seats and said bolster for supporting said bolster for movement transversely of the truck, a spring seat associated with each of said rocker seats, a spring seat disposed on said transom outwardly of each of said side frames, and a leaf spring supported on each of said side frames in the windows thereof and supporting said transom at the seats provided thereon and a coil spring interposed between one of said seats and each of said leaf springs.

44. In a truck, the combination of spaced side frames, a transom disposed between said side frames and having cooperative engagement therewith for tying said side frames together, said transom including spaced members, lateral motion means supported by said transom, a bolster having center and side bearings and disposed between said spaced members and supported by said lateral motion means for movement transversely of said truck, and a spring assembly interposed between said bolster and each side frame, said assembly including a semi-elliptic spring supported at a point intermediate its ends on said side frame.

45. In a truck, the combination of spaced side frames, a transom disposed between said side frames and having cooperative engagement therewith for tying said side frames together, said transom including spaced members, lateral motion means supported by said transom, a bolster having center and side bearings and disposed between said spaced members and supported by said lateral motion means for movement transversely of said truck, and a spring assembly interposed between said bolster and each side frame, said assembly including a semi-elliptic spring and a coil spring, said semi-elliptic spring being supported at a point intermediate its ends on said side frame.

46. In a truck, the combination of spaced side frames, a transom disposed between said side frames and having cooperative engagement therewith for tying said side frames together, said transom including spaced members, lateral motion means supported by said transom, a bolster having center and side bearings and disposed between said spaced members and supported by said lateral motion means for movement transversely of said truck, and a spring assembly interposed between said bolster and each side frame, said assembly including a semi-elliptic spring and a coil spring supported on one end of said semi-elliptic spring.

Signed at Chicago, Illinois, this 18th day of August, 1931.

WILLIAM C. HEDGCOCK.
ROBERT F. DARBY.